US012498663B2

(12) United States Patent
Watanabe et al.

(10) Patent No.: US 12,498,663 B2
(45) Date of Patent: Dec. 16, 2025

(54) IMAGE FORMING SYSTEM, DIAGNOSTIC METHOD, AND NON-TRANSITORY COMPUTER-READABLE RECORDING MEDIUM

(71) Applicant: Konica Minolta, Inc., Tokyo (JP)

(72) Inventors: Takashi Watanabe, Toyokawa (JP); Yoshikazu Watanabe, Toyohashi (JP); Yasuhiro Ishihara, Toyohashi (JP); Yukinobu Iguchi, Hamamatsu (JP); Shougo Kamiya, Otsuki (JP); Tatsuya Eguchi, Kawasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/650,849

(22) Filed: Apr. 30, 2024

(65) Prior Publication Data

US 2024/0385561 A1 Nov. 21, 2024

(30) Foreign Application Priority Data

May 16, 2023 (JP) ................................ 2023-080842

(51) Int. Cl.
*G03G 15/00* (2006.01)

(52) U.S. Cl.
CPC ......... *G03G 15/55* (2013.01); *G03G 15/5079* (2013.01)

(58) Field of Classification Search
CPC ............... G03G 15/55; G03G 15/5075; G03G 15/5079; G03G 15/5091; G03G 15/0935; G03G 15/1615; G03G 15/5008; G03G 15/757; G03G 21/1857; G03G 2215/00156; G03G 2221/1657
See application file for complete search history.

(56) References Cited

U.S. PATENT DOCUMENTS

2009/0212488 A1 8/2009 Hashimoto et al.
2010/0202787 A1 8/2010 Satonaga et al.
2015/0077027 A1* 3/2015 Seki ....................... G05B 13/02 318/400.15
2015/0077028 A1* 3/2015 Seki .................. G03G 15/1615 318/400.15
2017/0075275 A1* 3/2017 Chiba ................ G03G 15/2017
2018/0079611 A1* 3/2018 Kitamura ................. H04N 1/00
2019/0265624 A1* 8/2019 Sakai ................ G03G 15/5008
2020/0073301 A1* 3/2020 Sakai ................ G03G 15/2053
2021/0067636 A1* 3/2021 Otsuka .............. H04N 1/00068

FOREIGN PATENT DOCUMENTS

JP 2009204796 A 9/2009
JP 2010181714 A 8/2010

* cited by examiner

*Primary Examiner* — Carla J Therrien
(74) *Attorney, Agent, or Firm* — Osha Bergman Watanabe & Burton LLP

(57) ABSTRACT

An image forming system conveys a recording medium to form an image. The image forming system includes: a driver to drive an operation mechanism to convey a recording medium or an operation mechanism to form an image on the recording medium; a detector that detects a driving state of the driver; a diagnostic section diagnosing an abnormality of the operation mechanism based on a load obtained by converting a detection result by the detector based on a predetermined conversion condition; and an updater that, when at least one of components of the driver is replaced, updates the conversion condition in accordance with the replaced component.

16 Claims, 13 Drawing Sheets

| | MOTOR | | DRIVE CIRCUIT | | CPU | | AMP | | LFP |
|---|---|---|---|---|---|---|---|---|---|
| TORQUE CONVERSION FORMULA WHEN ALL COMPONENTS ARE GENUINE PRODUCTS | KMa | + | KDa | + | KCa | + | KAa | + | KLa |
| SUBSTITUTE | KMb | | KDb | | KCb | | KAb | | KLb |

TORQUE CONVERSION FORMULA: KMb + KDb + KCa + KAa + KLa

IMAGE FORMING SYSTEM, DIAGNOSTIC METHOD, AND NON-TRANSITORY COMPUTER-READABLE RECORDING MEDIUM

CROSS REFERENCE TO RELATED APPLICATIONS

The present application is based on Japanese Patent Application No. 2023-080842 filed on May 16, 2023, the contents of which are incorporated herein by reference.

BACKGROUND

Technical Field

The present invention relates to an Image Forming System, a Diagnostic Method, and a Non-Transitory Computer-Readable Recording Medium.

Description of the Related Art

Conventionally, there has been known an image forming apparatus such as an MFP (Multifunction Peripherals) that detects a load torque generated when a roller positioned on an upstream side in a sheet conveyance direction nips a sheet (e.g., Patent Literature 1: JP2009-204796A). The image forming apparatus estimates the load torque generated when the roller positioned on the downstream side nips the sheet based on the load torque on the upstream side. Then, the image forming apparatus controls the driving torque when driving the roller positioned on the downstream side.

Furthermore, an image forming apparatus that can predict the remaining usable period corresponding to the type of a consumable has been conventionally proposed (e.g., Patent Literature 2: JP2010-181714A). The image forming apparatus collates whether the type of the consumable used for the image forming processing is a type corresponding to a prediction mechanism for predicting the remaining usable period of the consumable. When the consumable is of a type corresponding to the prediction mechanism, the image forming apparatus performs prediction processing of the remaining usable period by the prediction mechanism. In addition, in a case of a consumable of a non-corresponding model, the image forming apparatus disables the prediction mechanism, and transmits consumable information including use history information of the consumable to the prediction server. The prediction server performs prediction processing of the remaining usable period by using the use history information, and responds to the image forming apparatus.

In general, an image forming apparatus includes multiple operation mechanisms such as rollers for conveying a sheet. The image forming apparatus drives each of the multiple operation mechanisms by a drive section such as a motor. The operation mechanism is a consumable item, and becomes a target of maintenance work such as component replacement or cleaning when reaching a state in which a normal operation cannot be performed. In this type of image forming apparatus, a current of a motor driving an operation mechanism is detected, and the detected current is converted into a load torque value. When the load torque value exceeds a predetermined threshold value, the image forming apparatus determines that an abnormality has occurred in the operation mechanism, and requests maintenance work. Thus, the image forming apparatus can receive maintenance service at an appropriate timing.

However, in recent years, due to a business continuity plan (BCP), an end of life (EOL), or the like, there has been a case where a component configuring the drive section is changed from a genuine product to a substitute. For example, a motor or a drive circuit for driving a motor may be changed from a genuine product to a substitute. However, a torque conversion formula for converting a current value of a motor into a torque value is a conversion formula on the assumption that a genuine product is used. Therefore, when a component constituting the drive section is replaced from a genuine product with a substitute, accuracy of a torque value calculated by the torque conversion formula decreases. As a result, there is a problem that an erroneous determination tends to occur in the determination of whether or not an abnormality has occurred in the operation mechanism. This problem cannot be solved even by using the conventional technologies of Patent Literatures 1 and 2 described above.

SUMMARY OF THE INVENTION

The present invention is directed to providing an image forming system, a diagnostic method, and a non-transitory computer-readable recording medium that solve the above-described problem. That is, an object of the present invention is to make it possible to accurately diagnose whether or not an abnormality has occurred in an operation mechanism even when a component constituting a driver has been replaced.

In order to achieve the above objects, firstly, the present invention is directed to an image forming system for conveying a recording medium to form an image.

In one aspect of the present invention, an image forming system includes a driver that drives an operation mechanism that conveys a recording medium or an operation mechanism that forms an image on the recording medium, a detector that detects a driving state of the driver, a diagnostic section that diagnoses an abnormality of the operation mechanism based on a load obtained by converting a detection result by the detector based on a predetermined conversion condition, and an updater that updates the conversion condition according to a component attached by replacement when at least a part of components of the driver is replaced.

Secondly, the present invention is directed to a diagnostic method in an image forming system that conveys a recording medium to form an image.

In one aspect of the present invention, the diagnostic method includes: acquiring a detection result obtained by detecting a driving state of a driver that drives an operation mechanism that conveys a recording medium or an operation mechanism that forms an image on the recording medium; diagnosing an abnormality of the operation mechanism based on a load obtained by converting the detection result based on a predetermined conversion condition; and updating the conversion condition in accordance with a component attached by replacement when at least a part of components of the driver is replaced.

Thirdly, the present invention is directed to a non-transitory computer-readable recording medium storing a computer readable program to be executed by a hardware processor in a server apparatus capable of communicating with an image forming apparatus that conveys a recording medium to form an image.

In one aspect of the present invention, the program causes the hardware processor to execute: acquiring a detection result obtained by detecting a driving state of a driver configured to drive an operation mechanism in the image forming apparatus; diagnosing abnormality of the operation mechanism based on a load obtained by converting the detection result based on a predetermined conversion condition; and updating the conversion condition in accordance with a component attached by replacement when at least a part of components of the driver is replaced in the image forming apparatus.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

DETAILED DESCRIPTION OF EMBODIMENTS

Figure 1:
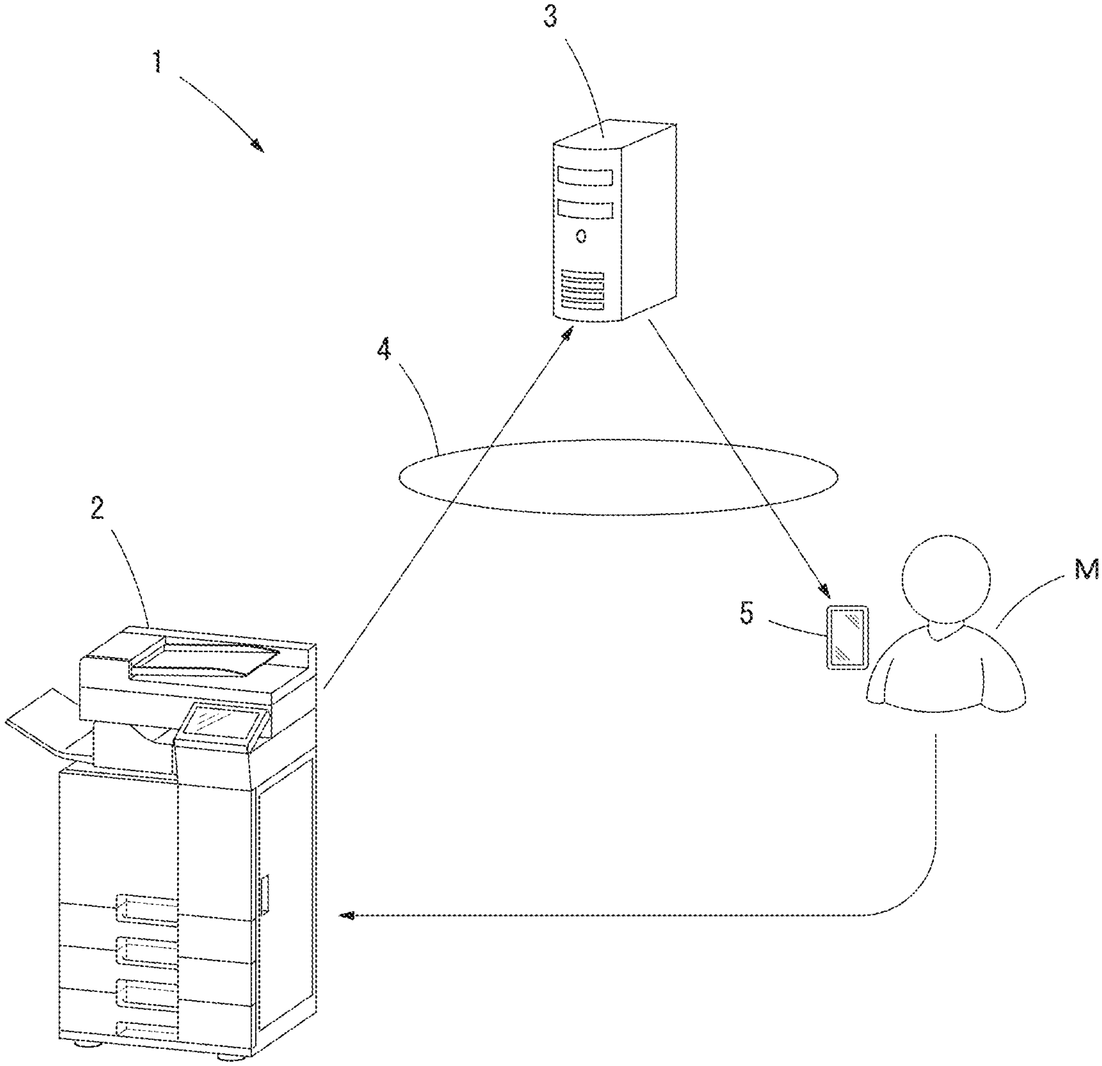
FIG. 1 illustrates an example of a conceptual configuration of an image forming system.

Hereinafter, one or more embodiments of the present invention will be described with reference to the drawings. However, the scope of the invention is not limited to the disclosed embodiments.

Hereinafter, preferred embodiments of the present invention will be described in detail with reference to the drawings. Note that elements common to the embodiments described below are denoted by the same reference numerals, and redundant description thereof is omitted.

First Embodiment

FIG. 1 illustrates an example of the conceptual configuration of an image forming system 1 according to a first embodiment of the present invention. As illustrated in FIG. 1, the image forming system 1 has a configuration in which an image forming apparatus 2 and a server apparatus 3 can communicate with each other via a network 4. The network 4 is a network including a local network such as a local area network (LAN) and a wide area network such as the Internet.

The image forming apparatus 2 is constituted by an MFP or the like and executes various jobs such as a scan job, a print job, and a copy job. For example, in the case of a print job, the image forming apparatus 2 conveys a sheet such as a print sheet, forms an image to be printed on the sheet, and outputs the sheet. The image forming apparatus 2 includes a post-processing unit 14 (see FIG. 2) as described later. The image forming apparatus 2 operates the post-processing unit 14 during execution of a print job to punch a hole in a sheet on which an image is formed or align a plurality of sheets and formwork a staple.

The image forming apparatus 2 includes a drive section (i.e., driver) that operates various operation mechanisms during execution of a job. The image forming apparatus 2 detects a drive state of the drive section as the drive section drives the operation mechanism. Further, the image forming apparatus 2 transmits a detection result obtained by detecting the driving state of the drive section to the server apparatus 3.

The server apparatus 3 can communicate with a plurality of image forming apparatuses 2 installed at various sites. The server apparatus 3 receives the detection result of detecting the driving state of the drive section transmitted from each of the multiple image forming apparatuses 2. Upon receiving the detection result from the image forming apparatus 2, the server 3 diagnoses, based on the detection result, whether an abnormality has occurred in an operation mechanism mounted in the image forming apparatus 2. When determining that an abnormality has occurred in the operation mechanism, the server apparatus 3 notifies the terminal device 5 carried by a serviceperson M or the like of the occurrence of the abnormality, thereby instructing the terminal device 5 to perform maintenance or the like.

Figure 2:
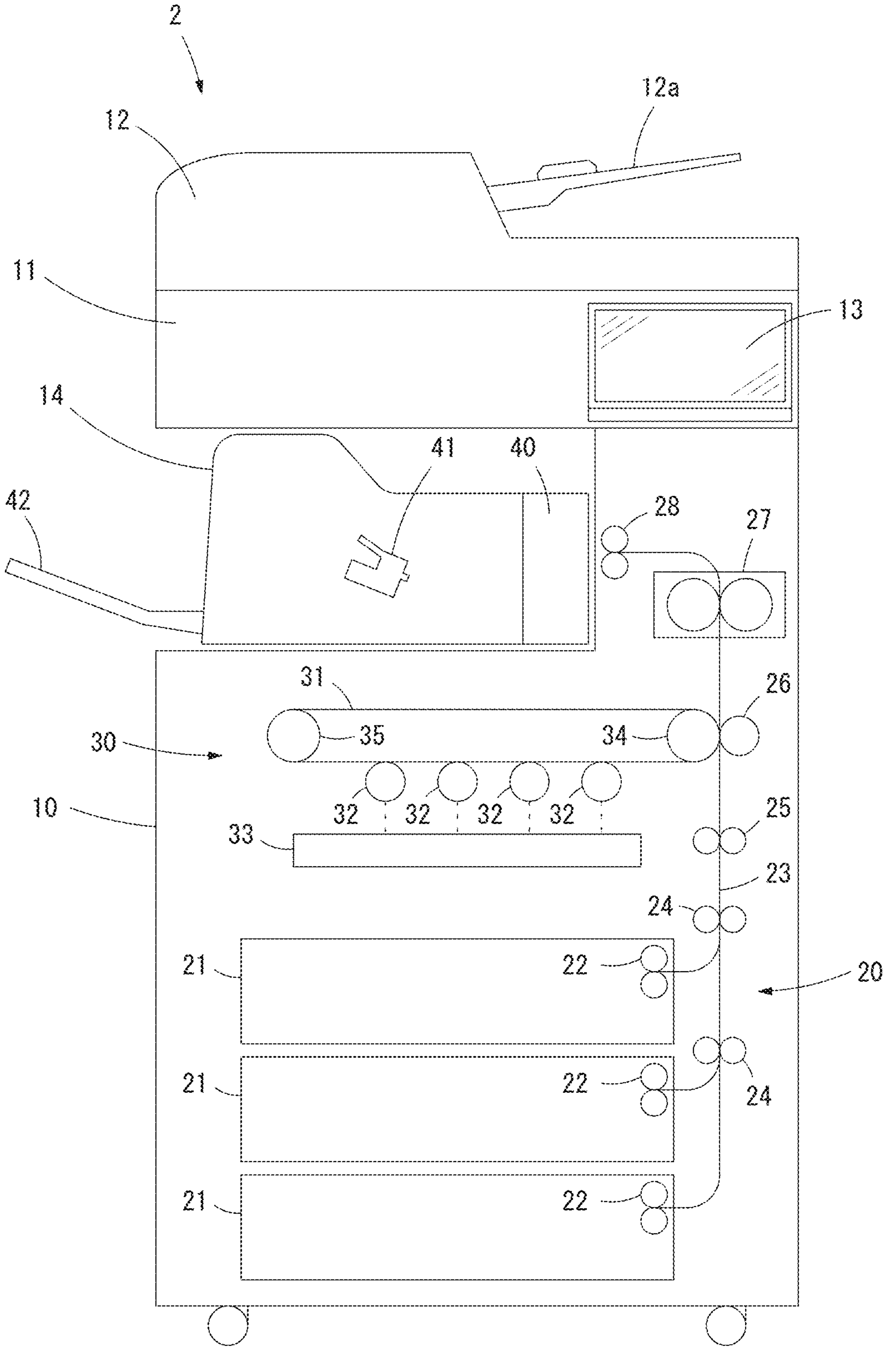
FIG. 2 illustrates an internal configuration of an image forming apparatus.

FIG. 2 illustrates an internal configuration of the image forming apparatus 2. The image forming apparatus 2 includes a printer section 10, a scanner section 11, an automatic document conveying section 12, an operation panel 13, and a post-processing unit 14.

The printer section 10 includes a sheet feed section 20, an image forming section 30, and a fixing section 27. The sheet feed section 20 includes a plurality of sheet feed cassettes 21, feeds a sheet such as a print sheet from a sheet feed cassette 21 specified by a user from among the multiple sheet feed cassettes 21, and conveys the sheet along a predetermined conveyance path 23. The image forming section 30 forms an image on a sheet when the sheet conveyed by the sheet feed section 20 passes through a predetermined position. The fixing section 27 performs a heating processing and a pressurizing processing on a sheet on which an image is formed by the image forming section 30, and fixes the image to the sheet.

The sheet feed section 20 includes a sheet feed roller 22 that feeds a sheet from each sheet feed cassette 21. The sheet feed section 20 further includes conveyance rollers 24 that convey the fed sheet along a conveyance path 23. Furthermore, the sheet feed section 20 includes timing rollers 25 that convey the sheet to an image forming position of the image forming section 30. The sheet feed section 20 further includes a secondary transfer roller 26 that secondarily transfers an image onto a sheet. Furthermore, the sheet feed section 20 includes ejection rollers 28 that eject the sheet.

These rollers of the sheet feed section 20 are one of operation mechanisms driven by a drive section such as a motor (not illustrated).

The image forming section 30 includes an intermediate transfer belt 31 formed of an endless belt. Furthermore, the image forming section 30 includes a plurality of image units 32 that contact the intermediate transfer belt 31 and primarily transfer images in respective colors of yellow (Y), magenta (M), cyan (C), and black (K) onto the intermediate transfer belt 31. The image forming section 30 further includes an exposure section 33 that exposes the photoconductor of each image unit 32. The intermediate transfer belt 31 is looped over the drive roller 34 and the driven roller 35. The intermediate transfer belt 31 circulates in a predetermined direction as the drive roller 34 is driven by a drive section, such as a motor (not illustrated). The image primarily transferred to the intermediate transfer belt 31 is secondarily transferred to the front surface of the sheet at the position of the secondary transfer roller 26. The photoconductor of the image unit 32 and the intermediate transfer belt 31 are one of operation mechanisms driven by a drive section such as a motor (not illustrated).

The scanner section 11 generates image data by optically reading an image of a document set by a user. The automatic document conveying section 12 is disposed above the scanner section 11, takes out documents placed on a document placement section 12*a* one by one, and automatically conveys the documents to a document reading position by the scanner section 11. The automatic document feeder 12 is provided with multiple rollers for conveying a document. These rollers are one of operation mechanisms driven by a drive section such as a motor (not illustrated).

The operation panel 13 provides a user interface when a user uses the image forming apparatus 2. For example, the operation panel 13 includes a display part that displays an operation screen that can be operated by a user. The operation panel 13 includes an operation part that receives a user operation. The display part includes a color liquid crystal display or the like. The operation part includes touch screen keys arranged on a screen of the display section.

The post-processing unit 14 receives the sheet ejected by the ejection rollers 28 of the printer section 10, and performs post-processing on the sheet on which the image has been formed. The post-processing unit 14 includes a punch hole processing section 40 and a binding processing section 41. The punch hole processing section 40 forms punch holes in the sheet ejected from the printer section 10. The binding processing section 41 aligns multiple sheets ejected from the printer section 10 and staples the sheets. The post-processing unit 14 ejects the sheet subjected to the post-processing to the sheet ejection tray 42. Such a post-processing unit 14 is equipped with multiple operation mechanisms and multiple drive sections for driving these operation mechanisms. Hereinafter, the relationship between the operation mechanism and the drive section will be described by taking the post-processing unit 14 as an example.

Figure 3:
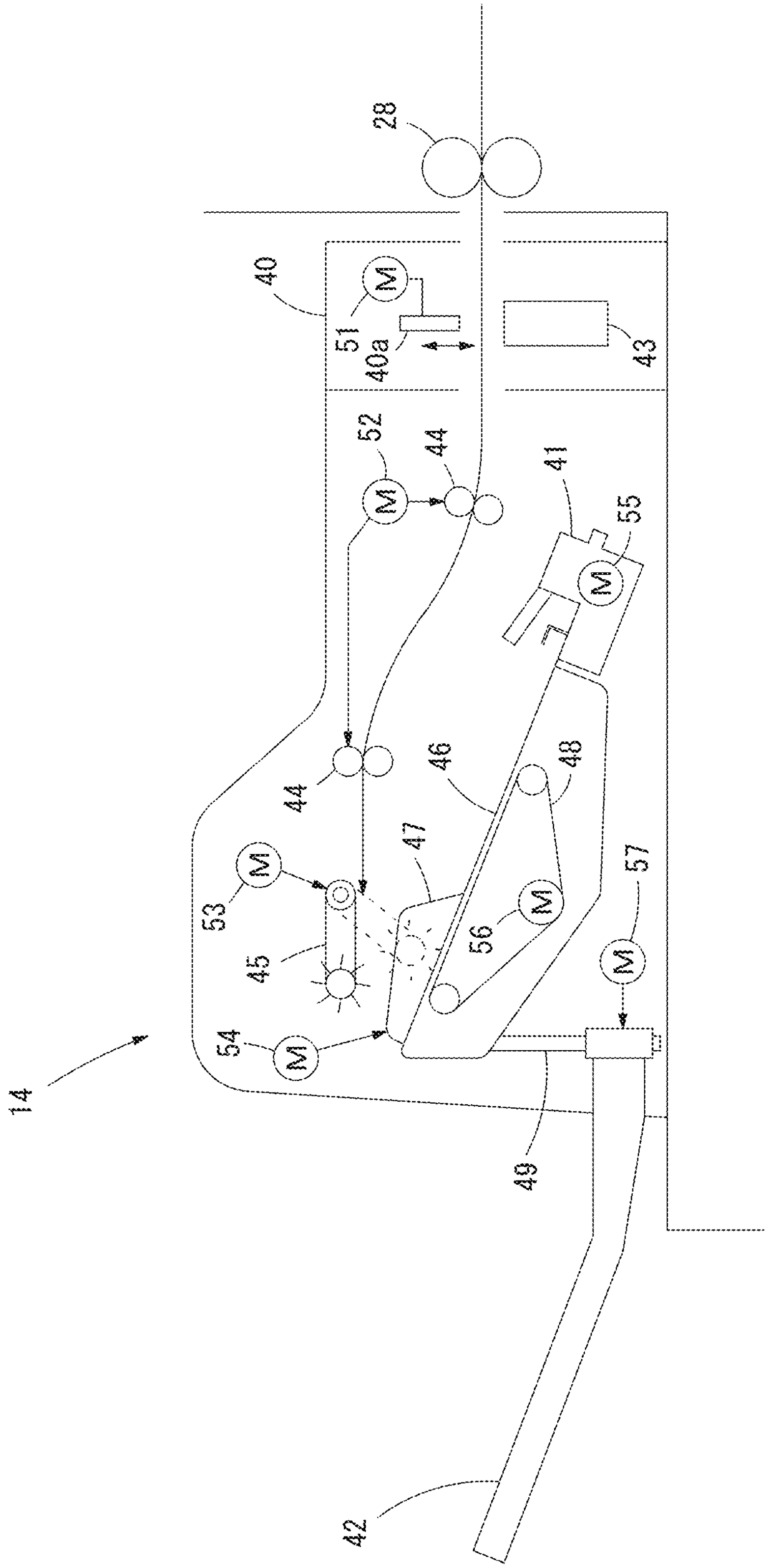
FIG. 3 illustrates an operation mechanism and a drive section of the post-processing unit.

FIG. 3 illustrates an operation mechanism and a drive section of the post-processing unit 14. The post-processing unit 14 includes a punch blade 40*a* that is movable in the vertical direction, a punch receiving portion 43, and a motor 51 inside the punch hole processing section 40. The punch blade 40*a* is driven in an up/down direction by the motor 51 to form punch holes in the sheet. Therefore, the punch blade 40*a* is an operation mechanism which is driven by the motor 51 which is a drive section.

Furthermore, the post-processing unit 14 includes multiple rollers 44 for conveying the sheet fed from the punch hole processing section 40, and a motor 52 for driving the multiple rollers 44. The roller 44 is an operation mechanism that is driven by a motor 52 that is a drive section.

The post-processing unit 14 includes a sheet stacking tray 46 for aligning the sheets conveyed by the rollers 44. A paddle roller 45 is disposed above the sheet stacking tray 46. The paddle roller 45 is attached to a distal end of an arm that swings in a vertical direction. When a sheet is conveyed by the roller 44, the paddle roller 45 descends while rotating, to drop the sheet into a sheet stacking tray 46. Next, the paddle roller 45 rotates the paddles to cause the end portions of the sheets to contact the formwork of the staple by the binding processing section 41. The paddle roller 45 is driven by a motor 53. Therefore, the paddle roller 45 is an operation mechanism driven by the motor 53 which is a drive section.

The sheet stacking tray 46 is provided with a regulating plate 47 for aligning both ends of the stacked sheets in a direction orthogonal to the sheet conveying direction. The regulating plate 47 is moved forward and backward in a direction orthogonal to a conveyance direction of the sheet by the motor 54. Therefore, the regulating plate 47 is an operation mechanism which is driven by the motor 54 which is a drive section.

The binding processing section 41 includes a motor 55 which is a drive section to perform formwork of the staple. Therefore, the binding processing section 41 is an operation mechanism which is driven by the motor 55.

The sheet stacking tray 46 includes, on its inclined bottom surface, a conveyance mechanism 48 for ejecting sheets. For example, the conveyance mechanism 48 includes a conveyance belt that is driven by the motor 56. Therefore, the transport mechanism 48 is an operation mechanism which is driven by the motor 56 which is a drive section. The conveyance mechanism 48 is configured such that, for example, it is driven after multiple sheets have been stapled by the binding processing section 41, and ejects the sheet bundle to the sheet ejection tray.

The sheet ejection tray 42 is driven to ascend and descend in the vertical direction in order to align the sheet bundle ejected by the conveying mechanism 48. That is, the sheet ejection tray 42 is driven by the motor 57, which is a drive section, and moves along the guide portion 49 disposed in the vertical direction. Therefore, the sheet ejection tray 42 is an operation mechanism which is driven to be ascend and descend by the motor 57 which is a drive section.

Figure 4:
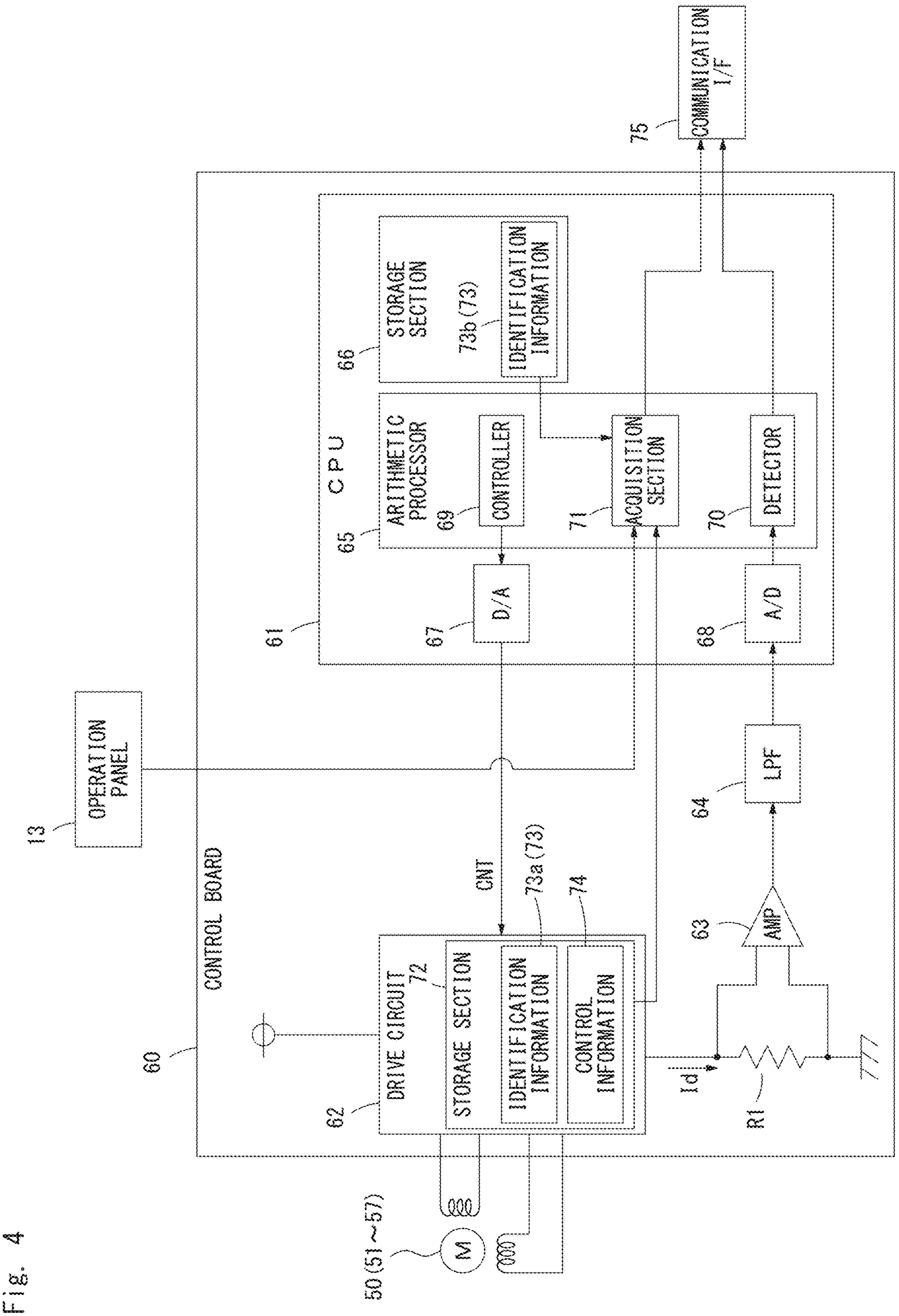
FIG. 4 is a block diagram illustrates a configuration of a drive section that drives an operation mechanism in the first embodiment.

FIG. 4 is a block diagram illustrating a configuration of a drive section that drives an operation mechanism. The drive section includes a motor 50 and a control board 60. The motor 50 illustrated in FIG. 4 is a generic term for the above-described motors 51 to 57. The control board 60 includes a CPU61, a drive circuit 62, a resistor R1, an amplifier 63, and a low pass filter 64. A communication interface 75 is connected to the control board 60. The communication interface 75 is for connecting the image forming apparatus 2 to the network 4 and communicating with the server 3.

CPU61 is an integrated circuit including an arithmetic processor 65, a storage section 66, a D/A converter 67, and an A/D converter 68. The arithmetic processor 65 is a hardware processor that executes a predetermined program. The arithmetic processor 65 functions as a controller 69, a detector 70, and an acquisition section 71 by executing a program. The storage section 66 stores identification information CPU61 for identifying a 73*b* that is a component of the drive section. That is, the identification information 73*b* is information with which it is possible to identify what characteristics the CPU61 mounted in the drive section has.

When a job is executed in the image forming apparatus 2, the controller 69 determines control in driving the motor 50 and outputs a control signal CNT to the drive circuit 62 via the D/A converter 67. The drive circuit 62 sends a drive current Id to the motor 50 based on a control signal CNT outputted from the controller 69. Thus, the motor 50 rotates and the operation mechanism operates.

The drive circuit 62 includes a storage section 72. The storage section 72 stores identification information 73*a* for identifying the drive circuit 62 which is a component of the drive section. That is, the identification information 73*a* is information capable of identifying which characteristic the drive circuit 62 mounted in the drive section is a product having. Control information 74 is stored in the storage section 72. The control information 74 is information in which a control mode such as an excitation control mode when the drive circuit 62 drives the motor 50 is recorded. For example, information as to whether the excitation control mode is the 1-2 phase excitation mode or the 2-2 phase excitation mode is recorded in the control information 74.

The current Id flowing through the motor 50 driven by the drive circuit 62 changes in accordance with the load torque of the operation mechanism. The current Id flows through the resistor R1. Therefore, a potential difference corresponding to the drive current Id is generated between both ends of the resistor R1. Provided that a change in the drive current Id is minute. Therefore, the amplifier 63 amplifies the potential difference between both ends of the resistor R1, thereby making it easy to detect a change in the load torque of the operation mechanism. The signal amplified by the amplifier 63 is supplied to the low-pass filter 64. The low pass filter 64 removes chopping noise included in the outputted voltage from the amplifier 63, and outputs a signal from which the noise has been removed to the A/D convertor 68 of the CPU61.

The A/D transducer 68 converts the analog signal output from the low pass filter 64 into a digital signal, and outputs the digital signal to the detector 70 of the arithmetic processor 65.

The detector 70 detects a driving state of the operation mechanism by the drive section based on the signal output from the A/D converter 68. Upon detection of a driven state of the operation mechanism by the drive section, the detector 70 transmits the detection result to the server apparatus 3 via the communication interface 75. Note that the detector 70 may transmit the digital signal output from the A/D converter 68 as it is to the server apparatus 3 via the communication interface 75.

Figure 5:
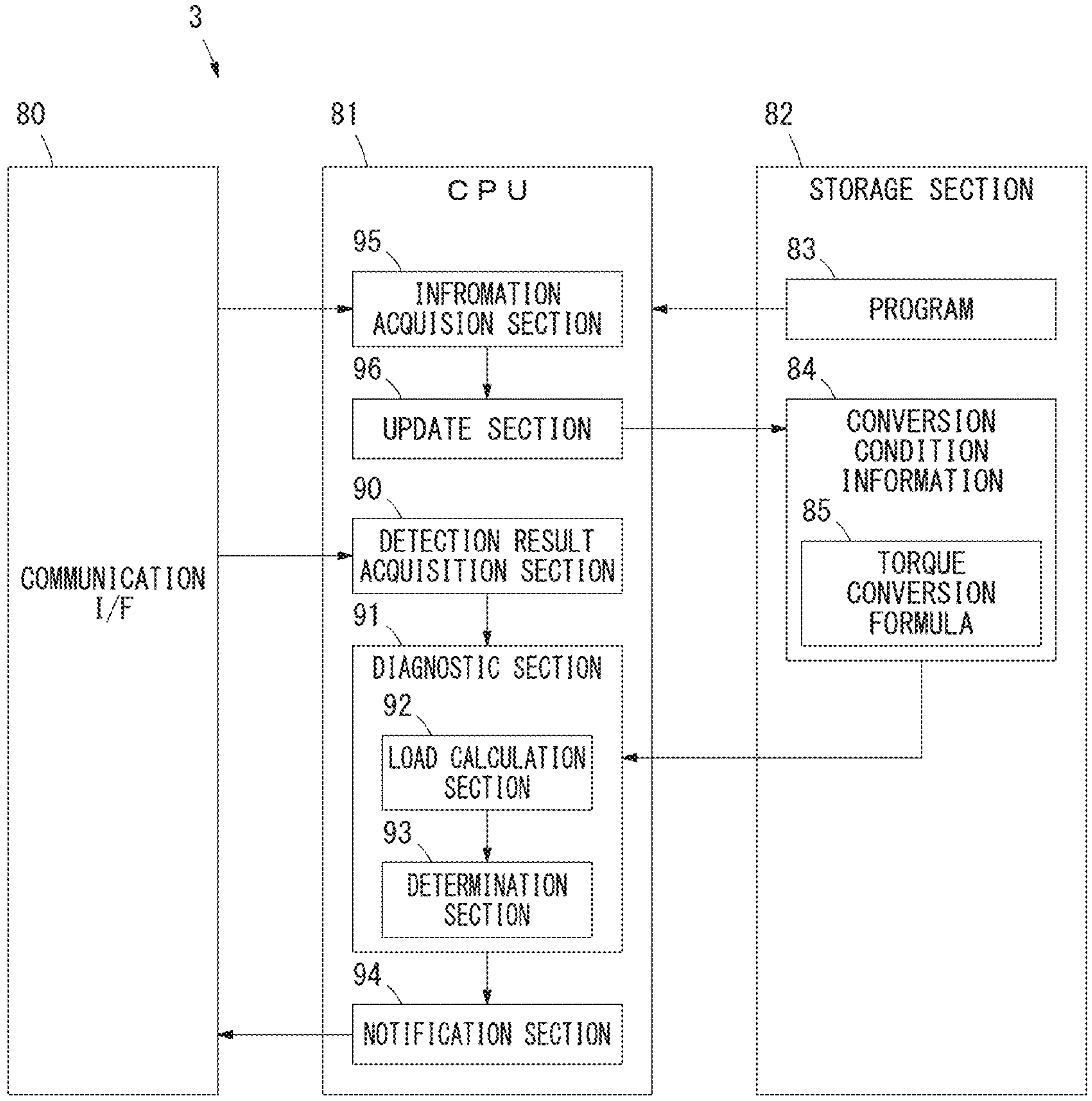
FIG. 5 is a block diagram illustrates a configuration of a server apparatus.

FIG. 5 is a block diagram illustrating the configuration of the server apparatus 3. The server apparatus 3 includes a communication interface 80, a CPU81, and a storage section 82. The communication interface 80 is for connecting the server apparatus 3 to the network 4 and communicating with the image forming apparatus 2 or the terminal device 5. The CPU81 is a hardware processor that reads and executes the program 83 stored in the storage section 82. The CPU81 functions as a detection result acquisition section 90, a diagnostic section 91, a notifying section 94, an information acquisition section 95, and an update section (i.e., updater) 96 by executing the program 83. The storage section 82 is a nonvolatile storage device constituted by a hard disk drive (HDD), a solid state drive (SSD), or the like.

The storage section 82 stores conversion condition information 84 in addition to the program 83. The conversion condition information 84 is information that defines a conversion condition for converting a detection result by the detector 70 of the image forming apparatus 2 into a load of an operation mechanism. In the conversion condition information 84, for example, a conversion condition in a case where all the components constituting the drive section are genuine products is defined in advance. The conversion conditions defined in the conversion condition information 84 are expressed as, for example, conversion formulas. The conversion condition information 84 illustrated in FIG. 5 includes a torque conversion formula 85 as a conversion condition. The torque conversion formula 85 is an arithmetic expression for converting a detection result by the detector 70 into a torque value (load torque value) of the motor 50. However, the conversion condition defined in the conversion condition information 84 is not necessarily limited to the one expressed as a conversion formula. For example, the conversion conditions may be expressed in the form of a table.

The detection result acquisition section 90 acquires a detection result output from the detector 70. When acquiring the detection result of detecting the driving state of the drive section, the detection result acquisition section 90 outputs the detection result to the diagnostic section 91.

The diagnostic section 91 diagnoses whether or not an abnormality has occurred in the operation mechanism driven by the drive section based on the detection result of detecting the drive state of the drive section. The diagnostic section 91 includes a load calculation section 92 and a determination section 93.

Figure 6:
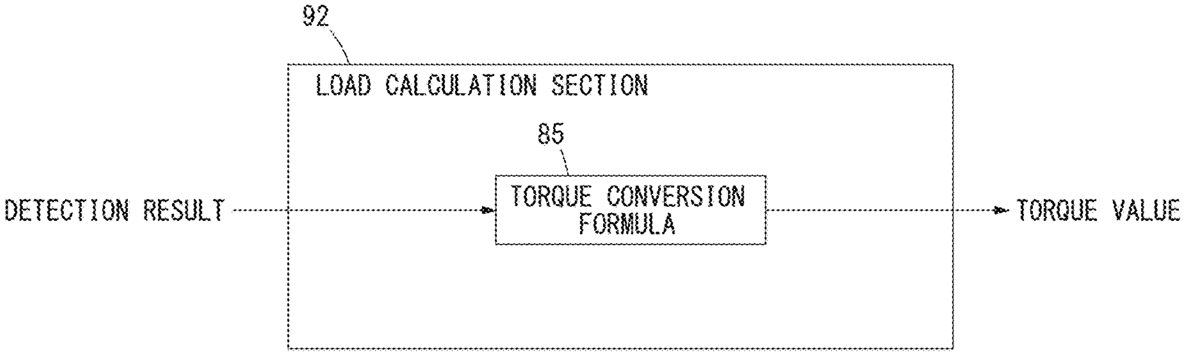
FIG. 6 illustrates an example of processing performed by the load calculation section.

The load calculation section 92 calculates a load applied to the drive section based on a detection result obtained by detecting a driving state of the drive section. The load calculation section 92 reads the conversion condition information 84 from the storage section 82, and converts the detection result of the driving state into a load on the operation mechanism based on the conversion conditions defined in the conversion condition information 84. FIG. 6 illustrates an example of processing by the load calculation section 92. As illustrated in FIG. 6, the load calculation section 92 calculates the torque value of the motor 50 based on the torque conversion formula 85 of the conversion condition information 84. Specifically, the load calculation section 92 calculates the torque value of the motor 50 by inputting the detection result of the driving state into the torque conversion formula 85 and performing calculation.

The determination section 93 compares the torque value calculated by the load calculation section 92 with a predetermined threshold value, and determines whether or not an abnormality has occurred in the operation mechanism driven by the motor 50. For example, when the torque value exceeds the threshold value, the determination section 93 determines that an abnormality has occurred in the operation mechanism, and causes the notification section 94 to function.

When the diagnostic section 91 diagnoses that an abnormality has occurred in the operation mechanism, the notification section 94 notifies, via the communication interface 80, the terminal device 5 carried by the serviceperson M or the like of the occurrence of the abnormality. The notification includes information capable of identifying the image forming apparatus 2 and the operation mechanism in which the abnormality has occurred. Therefore, the serviceperson M can identify the image forming apparatus 2 and the operation mechanism in which the abnormality has occurred by checking the notification received by the terminal device 5 from the server apparatus 3. Thereafter, the serviceperson M goes to the installation location of the image forming apparatus 2 in which the abnormality has occurred and performs maintenance work, cleaning work, or the like, thereby eliminating the abnormality.

In the above-described configuration, at least a part of components constituting the drive section may be replaced. At this time, due to BCP, EOL, or the like, a component constituting the drive section may be changed from a genuine product to a substitute. The image forming system 1 of the present embodiment is configured such that even in a case where a component constituting the drive section is changed from a genuine product to a substitute, accurate diagnosis can be performed in the diagnostic section 91. Hereinafter, a specific configuration for that will be described.

As illustrated in FIG. 4, the CPU61 provided in the drive section of the image forming apparatus 2 causes the acquisition section 71 to function when a component constituting the drive section is replaced. For example, when a component constituting the drive section is replaced by the serviceperson M, the serviceperson M inputs, to the operation panel 13, the fact that the component replacement of the drive section has been performed. Accordingly, the acquisition section 71 functions in the arithmetic processor 65. The acquisition section 71 acquires the identification information 73 of the replaced component in the drive section. For example, when the motor 50 of the drive section is replaced, the acquisition section 71 acquires the identification information 73 of the motor 50 newly attached to the drive section by component replacement. In addition, in a case where the drive circuit 62 of the drive section is replaced, the acquisition section 71 acquires the identification information 73 of the drive circuit 62 which is newly attached to the drive section by the component replacement. Further, when the CPU61 of the drive section is replaced, the acquisition section 71 acquires the identification information 73 of the CPU61 newly attached to the drive section by the component replacement. In addition, for example, the amplifier 63 or the low-pass filter 64 may be replaced. In that case, the acquisition section 71 acquires the identification information 73 of the amplifier 63 or the low-pass filter 64 newly attached to the drive section by the component replacement.

If a storage section is mounted on the replaced component, the acquisition section 71 reads and acquires the identification information 73 from the storage section. For example, when the CPU61 is replaced, the acquisition section 71 acquires the identification information 73*a* stored in the storage section 66 of the CPU61. Furthermore, when the drive circuit 62 is replaced, the acquisition section 71 acquires the identifying information 73*a* stored in the storage section 72 of the drive circuit 62.

In a case where a storage section is not mounted on the replaced component, the acquisition section 71 acquires the identification information 73 input to the operation panel 13 by the serviceperson M or the like. For example, when the motor 50, the amplifier 63, or the low-pass filter 64 is replaced, the acquisition section 71 acquires the identification information 73 of the replaced component based on the information input to the operation part of the operation panel 13.

When acquiring the identification information 73 of the component replaced in the drive section, the acquisition section 71 transmits the acquired identification information 73 to the server apparatus 3 via the communication interface 75.

As illustrated in FIG. 5, the CPU81 of the server apparatus 3 functions as an information acquisition section 95 and an update section 96. The information acquisition section 95 acquires the identification information 73 transmitted from the image forming apparatus 2. Upon acquiring the identification information 73, the information acquiring section 95 outputs the identification information 73 to the update section 96.

The update section 96 specifies the replaced component in the drive section based on the identification information 73 acquired by the information acquisition section 95. When the component newly attached to the drive section by the component replacement is not a genuine product but a substitute, the update section 96 updates the conversion condition of the conversion condition information 84 stored in the storage section 82 to a conversion condition corresponding to the substitute. For example, the update section 96 according to the present embodiment updates the torque conversion formula 85 included in the conversion condition information 84 to the torque conversion formula 85 corresponding to the substitute.

Figure 7:
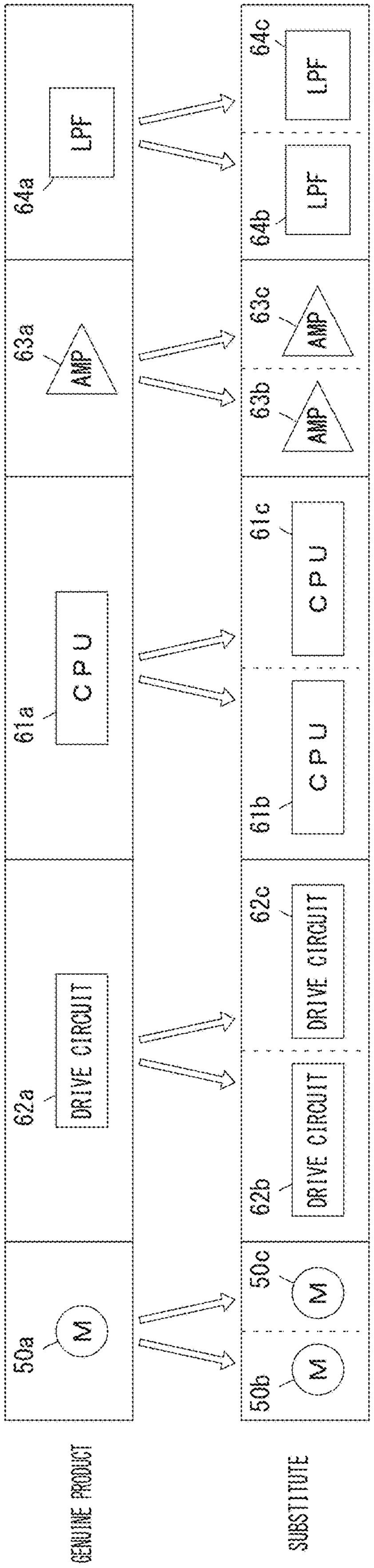
FIG. 7 illustrates an example of a substitute to be replaced from a genuine product.

FIG. 7 illustrates an example of a substitute to be replaced from a genuine product. In the example illustrated in FIG. 7, for each of the motor 50*a*, the drive circuits 62*a* and CPU 61*a*, the amplifier 63*a*, and the low pass filter 64*a* that are genuine products, each of the motors 50*b*, 50*c*, the drive circuits 62*b*, 62*c*, CPU 61*b*, 61*c*, the amplifiers 63*b*, 63*c* and the low pass filters 64*b*, 64*c* are set as substitutes. Therefore, when the genuine product is replaced, one of the two substitutes is attached to the drive section. When at least one component is changed from a genuine product to a substitute product by component replacement of the drive section, a combination of components in the drive section is changed. Therefore, when the component replacement of the drive section is performed, the update section 96 specifies the combination of the components after the component replacement, based on the identification information 73 of the replaced component. Based on the combination of the components, the update section 96 updates the torque conversion formula 85 to a conversion formula corresponding to the replaced component.

Figure 8:
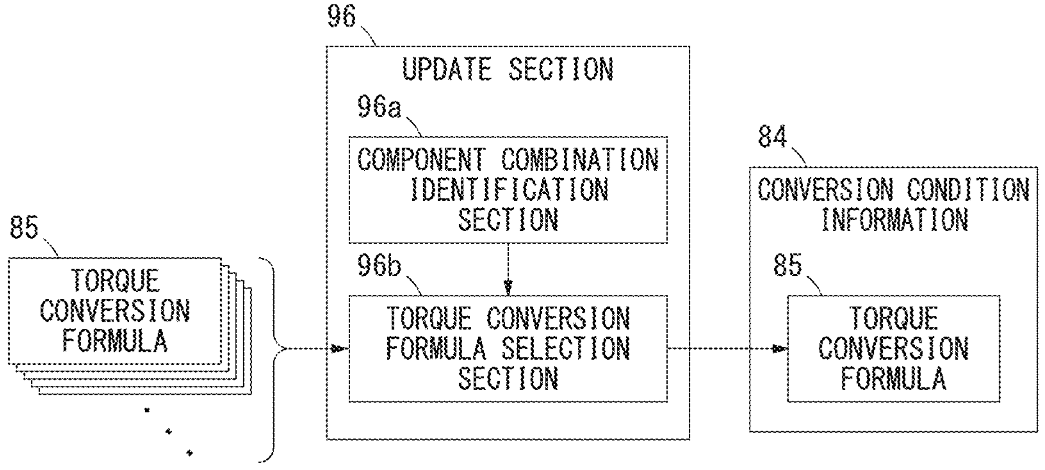
FIG. 8 is a block diagram illustrates a configuration example of an updating section.

FIG. 8 is a block diagram illustrating an example of the configuration of the update section 96. The update section 96 includes a component combination identification section 96*a* and a torque conversion formula selection section 96*b*. As described above, the component combination identification section 96*a* identifies the combination of the components of the drive section after the component replacement based on the identification information 73 of the replaced component. The torque conversion formula selection section 96*b* selects one torque conversion formula 85 from a plurality of torque conversion formulas 85 corresponding to various combinations of components based on the combination specified by the component combination identification section 96*a*. The torque conversion formula selection section 96*b* updates the torque conversion formula 85 by rewriting the torque conversion formula 85 of the conversion condition information 84 with the selected torque conversion formula 85. Note that a plurality of torque conversion formula 85 corresponding to various combinations of components may be stored in advance in the storage section 82.

Figures 9A, 9B, 9C:
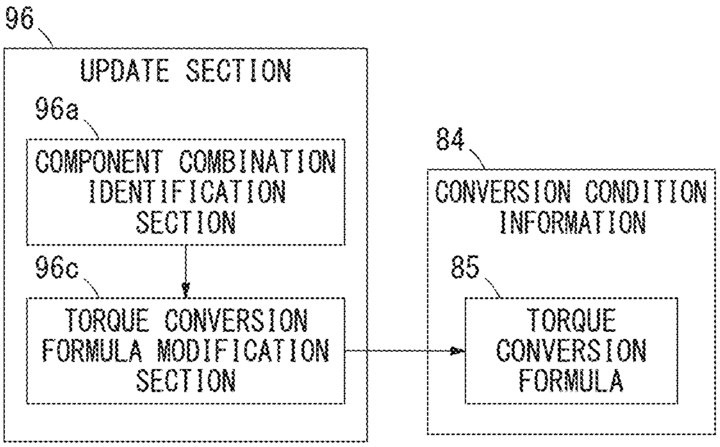
FIGS. 9A, 9B, and 9C are block diagrams illustrate configuration examples of an updating section different from that in FIG. 8.

FIG. 9A is a block diagram illustrating an example of a configuration of an update section 96 different from that in FIG. 8. As illustrated in FIG. 9A, the update section 96 includes a component combination identification section 96*a* and a torque conversion formula modification section 96*c*. The part combination identification section 96*a* is the same as that illustrated in FIG. 8. The torque conversion formula modification section 96*c* generates a torque conversion formula 85 corresponding to the replaced part by modifying the torque conversion formula 85 included in the conversion condition information 84. For example, as illustrated in FIG. 9B, the torque conversion formula 85 in the case where all the components are genuine products is represented by elements of the motor 50*a* which is a genuine product, elements of the drive circuit 62*a* which is a genuine product, elements of the CPU61*a* which is a genuine product, elements of the amplifier 63*a* which is a genuine product, and elements of the low pass filter 64*a* which is a genuine product. The torque conversion formula modification section 96*c* replaces the element of each part included in the torque conversion formula 85 with the element of the substitute attached to the drive section by the parts replacement, and updates the torque conversion formula 85 included in the conversion condition information 84. For example, in a case where the motor 50*a* is replaced with the motor 50*b* and the drive circuit 62*a* is replaced with the drive circuit 62*b* by the component replacement, the torque conversion formula 85 in a case where all the components are genuine products is transformed into a torque conversion formula as illustrated in FIG. 9C.

Thereafter, the diagnostic section 91 of the server apparatus 3 calculates the load from the detection result of the driving state of the drive section using the conversion condition information 84 updated by the update section 96. That is, when acquiring the detection result indicating the driving state of the drive section from the image forming apparatus 2, the load calculating section 92 converts the detection result by the torque conversion formula 85 updated by the update section 96, thereby calculating the torque value (load torque value) of the motor 50. The torque conversion formula 85 used at this time has been updated to a conversion formula that reflects the replacement of the component of the drive section. Therefore, the load calculation section 92 can calculate the torque value of the motor 50 with high accuracy. As a result, when the determination section 93 determines whether or not an abnormality has occurred in the operation mechanism driven by the motor 50, it is possible to accurately perform abnormality diagnosis of the operation mechanism without making an erroneous determination.

Incidentally, when a component of the drive section is changed from a genuine product to a substitute, the control of the motor 50 may change. For example, when the motor 50 is replaced from a genuine product to a substitute and the drive circuit 62 is also replaced from a genuine product to a substitute, the excitation control mode may be changed. When the control of the motor 50 is changed, the load torque of the motor 50 also change. Therefore, it is preferable that the update section 96 updates the conversion conditions in the conversion condition information 84 in accordance with the control of the motor 50. Therefore, when the component of the drive section is replaced, the acquisition section 71 of the image forming apparatus 2 acquires the control information 74 from the storage section 72 of the drive circuit 62 and transmits the control information 74 to the server apparatus 3. When acquiring the control information 74 from the image forming apparatus 2, the update section 96 of the server apparatus 3 specifies the control mode when the drive section drives the operation mechanism based on the control information 74, and further updates the torque conversion formula 85 according to the control mode. In this case, the update section 96 updates the torque conversion formula 85 based on both the identification information 73 and the control information 74. Thus, even when the control of the motor 50 is changed, the abnormality diagnosis of the operation mechanism can be normally performed.

Figure 10:
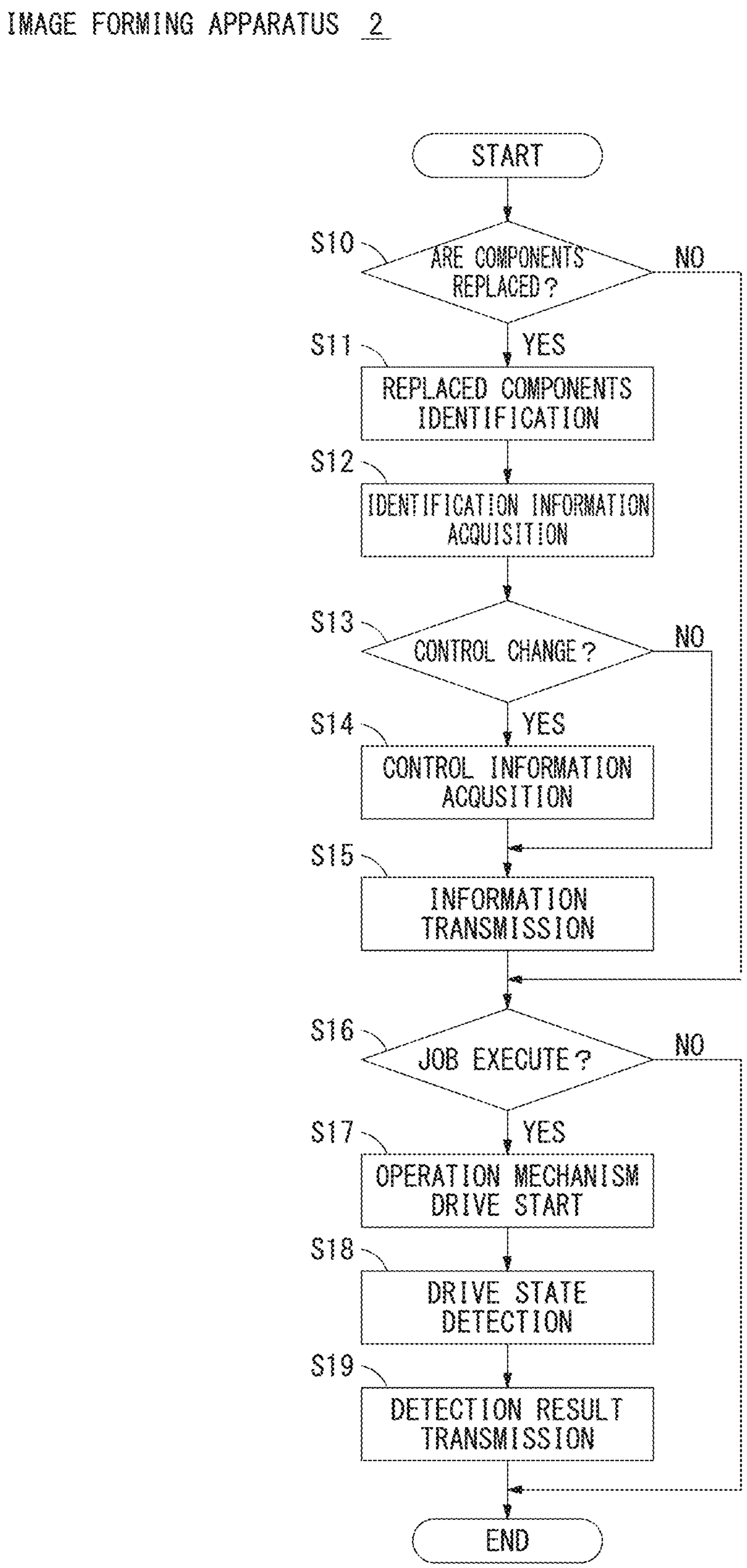
FIG. 10 is a flowchart illustrates an example of a processing procedure performed in the image forming apparatus.

Next, an example of specific operation of the image forming apparatus 2 will be described. FIG. 10 is a flowchart illustrating an example of a processing procedure performed in the image forming apparatus 2. This processing is performed by the arithmetic processor 65 of the CPU61 described above executing a predetermined program. When starting this processing, the image forming apparatus 2 determines whether or not the component replacement of the drive section has been performed (step S10). When the component of the drive section is replaced (YES in step S10), the image forming apparatus 2 specifies the replaced component (step S11), and acquires the identification information 73 of the component newly attached to the drive section by the component replacement (step S12).

Next, the image forming apparatus 2 determines whether the control of the motor 50 has been changed (step S13). If the control of the motor 50 has been changed (YES in step S13), the image forming apparatus 2 acquires the control information 74 (step S14). Note that if the control of the motor 50 has not changed before and after the replacement of a component (NO in step S13), the processing in step S14 is skipped. Thereafter, the image forming apparatus 2 transmits the identification information 73 acquired in step S12 and the control information 74 acquired in step S14 to the server apparatus 3 (step S15). Note that in a case where the component replacement of the drive section is not performed (NO in step S10), the processing in steps S11 to S15 is skipped.

Next, the image forming apparatus 2 determines whether execution of a job has been instructed (step S16). If the execution of the job has been instructed (YES in step S16), the image forming apparatus 2 operates the drive section to start driving the operation mechanism (step S17). When the driving of the operation mechanism is started, the image forming apparatus 2 detects the driving state of the drive section (step S18). Then, the image forming apparatus 2 transmits the detection result indicating the driving state of the drive section to the server apparatus 3 (step S19). Note that when the execution of the job is not instructed, the processing of steps S17 to S19 is skipped.

The image forming apparatus 2 repeatedly executes the processing as described above. Therefore, when the component of the drive section is replaced, the image forming apparatus 2 transmits the identification information 73 of the replaced component to the server apparatus 3. In addition, in a case where the control of the motor 50 is changed due to the component replacement, the image forming apparatus 2 transmits the control information 74 indicating the control of the motor 50 to the server apparatus 3. Further, the image forming apparatus 2 transmits a detection result obtained by detecting the driving state of the drive section to the server apparatus 3 in accordance with the start of the execution of the job.

Figure 11:
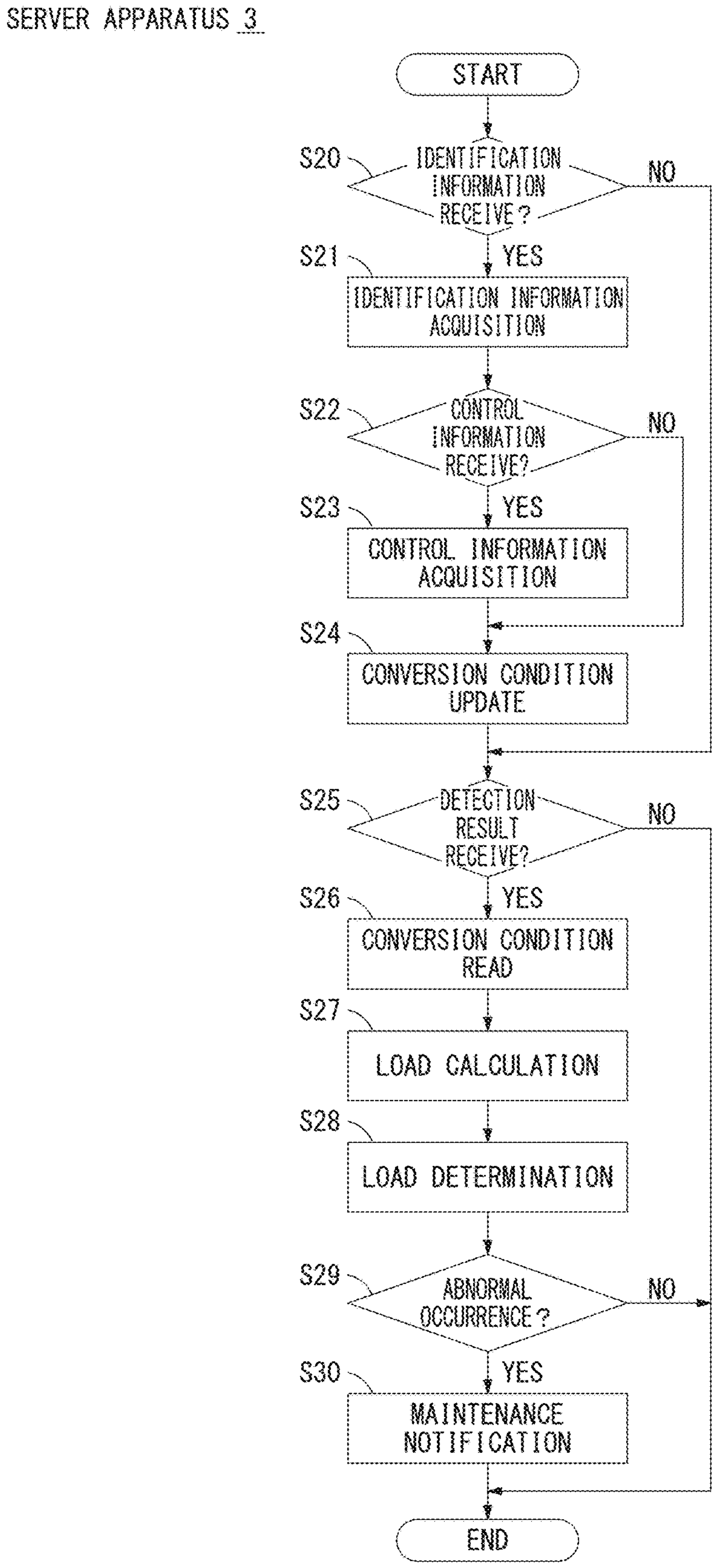
FIG. 11 is a flowchart illustrates an example of a processing procedure performed in the server apparatus.

Next, an example of specific operation of the server apparatus 3 will be described. FIG. 11 is a flowchart illustrating an example of a processing procedure performed at the server apparatus 3. This processing is performed by the above-described CPU81 executing the program 83. When starting this processing, the server apparatus 3 determines whether or not the identification information 73 is received from the image forming apparatus 2 (step S20). If the identification information 73 has been received from the image forming apparatus 2 (YES in step S20), the server apparatus 3 acquires the received identification information 73 (step S21). Next, the server apparatus 3 determines whether the control information 74 has been received from the image forming apparatus 2 (step S22). If the control information 74 has been received (YES in step S22), the server apparatus 3 acquires the received control information 74 (step S23). Note that when the control information 74 has not been received (NO in step S22), the processing of step S23 is skipped. Subsequently, the server apparatus 3 updates the conversion condition defined in the conversion condition information 84 based on the information received from the image forming apparatus 2 (step S24). Thus, the conversion condition information 84 in the storage section 82 is updated. When the identification information 73 is not received from the image forming apparatus 2 (NO in step S20), the processing of steps S21 to S24 is skipped.

Next, the server apparatus 3 determines whether or not a detection result by the detector 70 has been received while the job is being executed in the image forming apparatus 2 (step S25). If the detection result has been received (YES in step S25), the server apparatus 3 reads the conversion condition of the conversion condition information 84 from the storage section 82 (step S26). Based on the conversion conditions, the server apparatus 3 converts the result of detection by the detector 70 into the load on the drive section (step S27). The server apparatus 3 performs determination processing for comparing the load with a predetermined value (step S28) and determines whether an abnormality has occurred in the operation mechanism (step S29). As a result, when determining that an abnormality has occurred in the operation mechanism (YES in step S29), the server 3 sends a maintenance notification to the terminal 5 of the serviceperson M (step S30). When it is determined that no abnormality occurs in the operation mechanism, the processing of step S30 is skipped. When the detection result by the detector 70 has not been received (NO in step S25), the processing of steps S26 to S30 is skipped.

The server apparatus 3 repeatedly executes the processing as described above. Therefore, upon receiving the identifying information 73 from the image forming apparatus 2, the server apparatus 3 updates the conversion conditions in the conversion condition information 84 based on the identifying information 73. The server apparatus 3 can also update the conversion condition based on the control information 74. When the server apparatus 3 receives the detection result by the detector 70 from the image forming apparatus 2 after updating the conversion condition, the server apparatus 3 can convert the detection result based on the updated conversion condition.

As described above, the image forming system 1 according to the present embodiment includes a drive section that drives an operation mechanism that conveys a sheet or an operation mechanism that forms an image on a sheet. Further, the image forming system 1 includes a detector 70 that detects a driving state of a drive section that drives the operation mechanism. Further, the image forming system 1 includes the diagnostic section 91 that diagnoses an abnormality of the operation mechanism based on the load obtained by converting the detection result by the detector 70 based on a predetermined conversion condition. In addition, the image forming system 1 includes the update section 96 that updates the conversion condition in accordance with a component attached by replacement when at least a part of the components of the drive section is replaced. Therefore, the image forming system 1 according to the present embodiment can update the conversion condition even if a component constituting the drive section is replaced from a genuine product to a substitute. Further, the image forming system 1 can convert the detection result by the detector 70 into an accurate load by updating the conversion condition. Therefore, in the image forming system 1, an erroneous determination does not occur in the determination of whether or not an abnormality has occurred in the operation mechanism. Furthermore, the image forming system 1 according to the present embodiment uses, as the conversion condition, the torque conversion formula 85 for converting the result of detection by the detector 70 into a torque value. Therefore, the image forming system 1 according to the present embodiment can calculate an accurate torque value from the result of detection by the detector 70 by updating the torque conversion formula 85 even if a component constituting the drive section is replaced from a genuine product to a substitute.

Further, the update section 96 in the image forming system 1 of the present embodiment updates the torque conversion formula in accordance with the control when the drive section drives the operation mechanism. Therefore, even if the control when the drive section drives the operation mechanism is changed by replacing the component constituting the drive section from the genuine product to the substitute, the image forming system 1 can calculate an accurate torque value from the detection result by the detector 70.

Therefore, the image forming system 1 of the present embodiment can accurately diagnose whether or not an abnormality has occurred in the operation mechanism even when a component constituting the drive section has been replaced.

Second Embodiment

Next, a second embodiment of the present invention will be described. In the first embodiment, the example in which the load calculation section 92 that calculates the load applied to the drive section based on the detection result of detecting the driving state of the drive section is provided in the server apparatus 3 has been described. However, the load calculation section 92 may be provided in a device other than the server apparatus 3. For example, the load calculation section 92 described above can be provided in the image forming apparatus 2. Therefore, in this embodiment, a mode in which the load applied to the drive section is calculated in the image forming apparatus 2 based on the detection result obtained by detecting the driving state of the drive section will be described.

Figure 12:
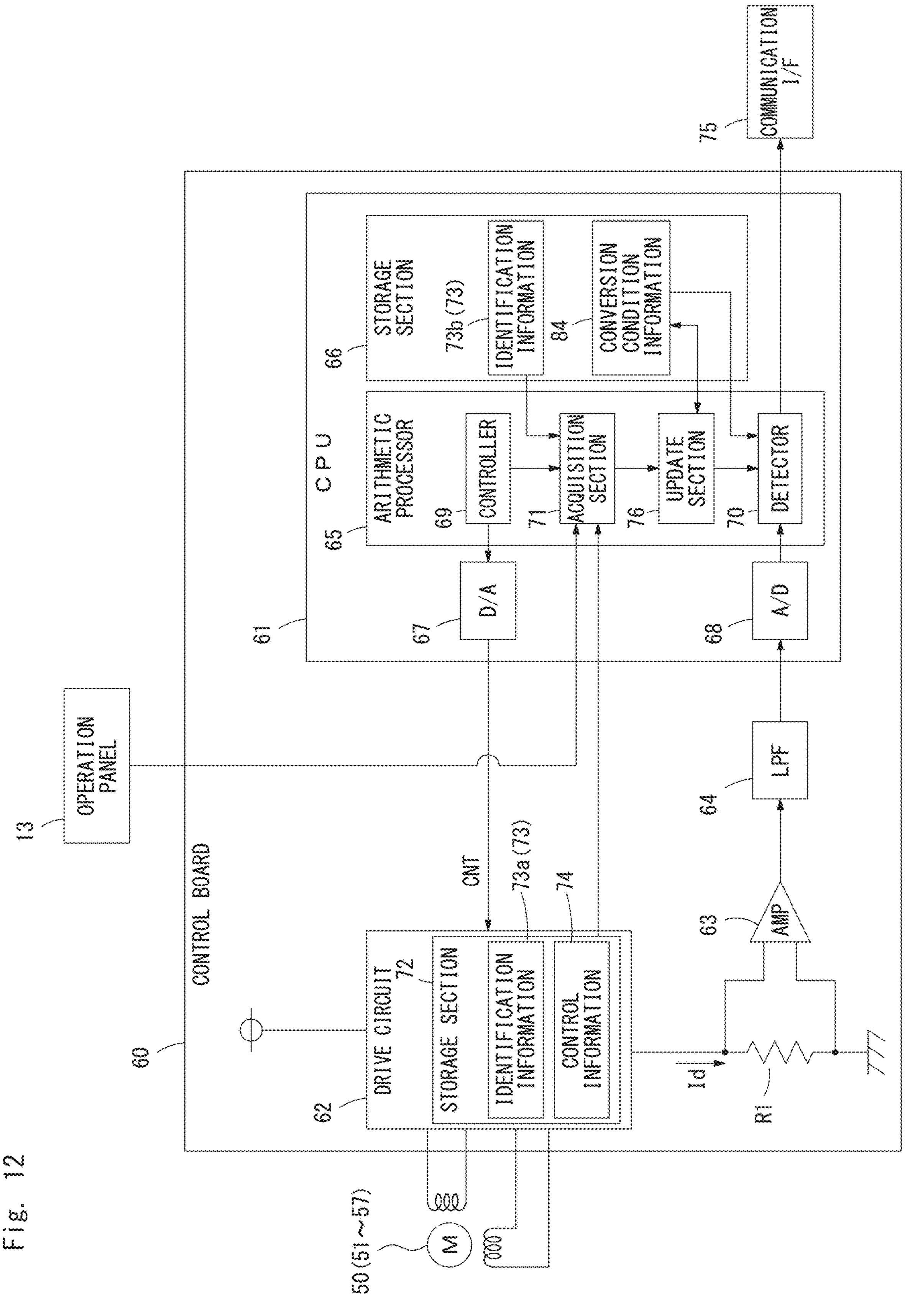
FIG. 12 is a block diagram illustrates a configuration of a drive section that drives an operation mechanism in the second embodiment.

FIG. 12 is a block diagram illustrating the configuration of the image forming apparatus 2 in the present embodiment, more specifically, the configuration of a drive section for driving an operation mechanism. The configuration of the drive section illustrated in FIG. 12 is different from the configuration (FIG. 4) of the drive section described in the first embodiment in that the detector 70 has the function of the load calculation section 92 described above and includes an update section 76.

The detector 70 according to the present embodiment detects the driving state of the operation mechanism by the drive section based on the signal output from the A/D converter 68, and calculates the load applied to the drive section based on the detection result. In the present embodiment, the conversion condition information 84 described in the first embodiment is stored in the storage section 66 of the CPU61. The detector 70 reads the conversion condition information 84 from the storage section 66, detects the driving state of the operation mechanism by the drive section, and calculates the load applied to the drive section based on the detection result. Next, the detector 70 transmits the load applied to the drive section to the server apparatus 3. For example, when the torque conversion formula 85 is included in the conversion condition information 84, the detector 70 calculates the torque value of the motor 50 based on the result of detecting the driving state of the drive section, and transmits the torque value to the server apparatus 3. The server apparatus 3 diagnoses, based on the load received from the image forming apparatus 2, whether an abnormality has occurred in the operation mechanism.

When the component of the drive section is replaced, the acquisition section 71 and the update section 76 function in the calculation processing section 65. The acquisition section 71 acquires the identification information 73 of the replaced component in the drive section. The acquisition section 71 also acquires the control information 74. Upon acquiring the identification information 73 and the control information 74, the acquisition section 71 outputs them to the update section 76.

Based on the information acquired by the acquiring section 71, the updating section 76 updates the conversion conditions defined in the conversion condition information 84. That is, the update section 76 specifies the component attached to the drive section by the component replacement, and updates the conversion condition according to the component. Furthermore, when the control of the motor 50 is changed due to the replacement of a component, the update section 76 updates, based on the control information 74, the conversion condition so as to be adapted to the control of the motor 50 after the replacement of the component. When the conversion condition information 84 includes the torque conversion formula 85, the update section 76 updates the torque conversion formula 85.

After the replacement of the component, when a job is executed in the image forming apparatus 2, the detector 70 applies the conversion condition updated by the update section 76, and detects the load applied to the drive section. Therefore, even when the component of the drive section is replaced, the server apparatus 3 can accurately diagnose whether or not an abnormality occurs in the operation mechanism.

Configurations and operations other than those described above are the same as those described in the first embodiment.

Third Embodiment

Next, a third embodiment of the present invention will be described. In the first embodiment, an example in which the server apparatus 3 acquires the identification information 73 and the control information 74 from the image forming apparatus 2 has been described. In the present embodiment, a mode in which the server apparatus 3 acquires the identification information 73 and the control information 74 from an external apparatus different from the image forming apparatus 2 will be described.

Figure 13:
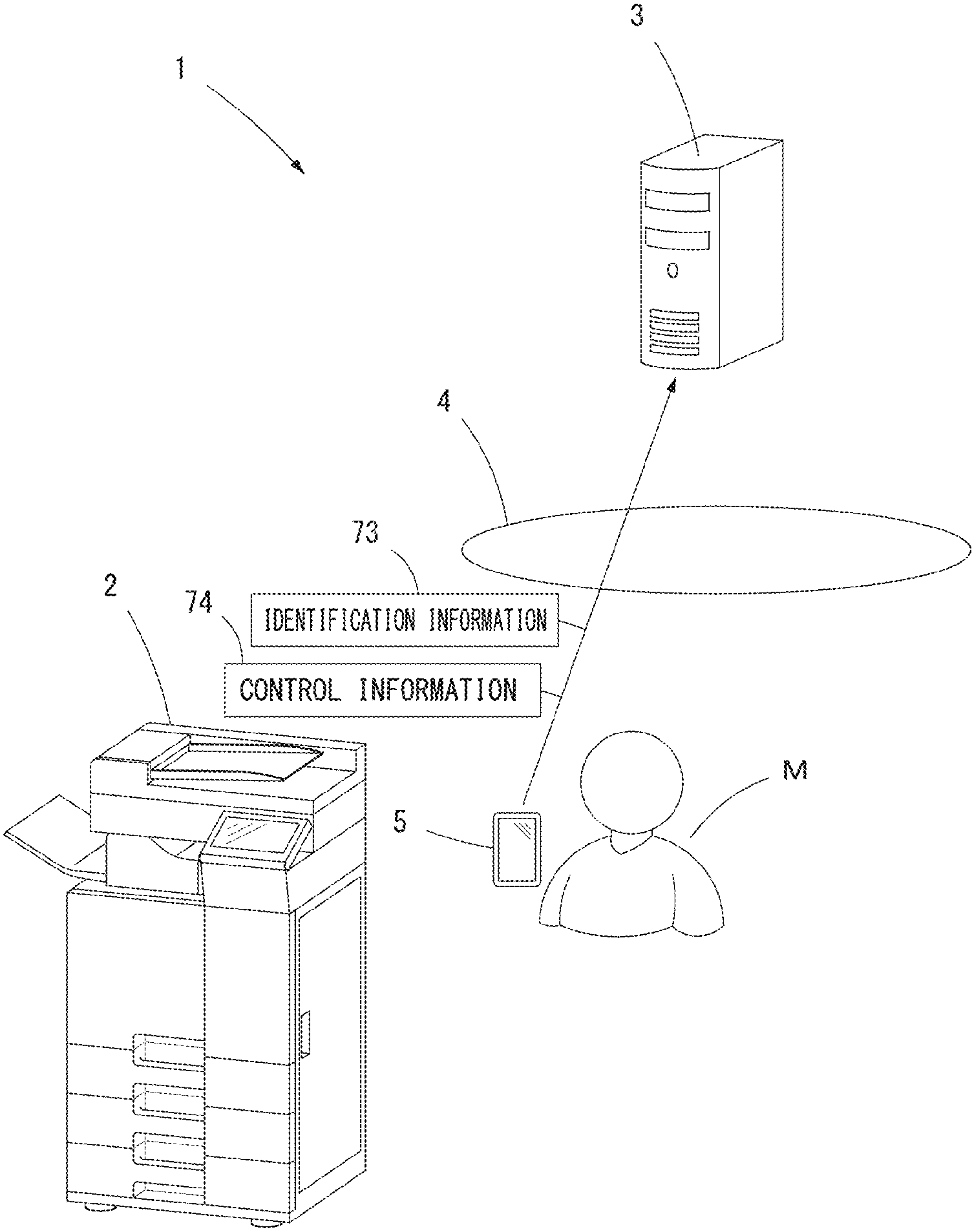
FIG. 13 illustrates an image forming system in a third embodiment.

FIG. 13 illustrates the image forming system 1 according to the third embodiment. Work for replacing a component of the drive section such as the motor 50 is performed by a serviceman M or the like. Therefore, after the component replacement, the serviceman M inputs, to his/her own terminal device 5, the identifying information 73 of the replaced component and the control information 74 indicating the control of the motor 50 after the component replacement. When the identification information 73 and the control information 74 are input by the serviceperson M, the terminal device 5 transmits these information to the server apparatus 3. At this time, the terminal apparatus 5 adds information capable of specifying the image forming apparatus 2 and transmits the information to the server apparatus 3. Therefore, the server apparatus 3 can acquire the identification information 73 and the control information 74 from the terminal device 5 (external device) carried by the service person M, and can update the conversion condition according to the replaced component.

Configurations and operations other than those described above are the same as those described in the first embodiment or the second embodiment.

Modification Example

Hereinabove, several preferred embodiments of the present invention have been described. However, the present invention is not limited to the content described in each of the above embodiments, and various modification examples are applicable.

For example, the image forming system 1 of the above-described embodiment includes the image forming apparatus 2 and the server apparatus 3. However, the image forming system 1 of the present invention is not limited to such a configuration. For example, the image forming system 1 of the present invention may be configured as a single apparatus in which the image forming apparatus 2 and the server apparatus 3 described above are integrated.

In addition, in the above-described embodiment, the motor 50, the CPU61, the drive circuit 62, the amplifier 63, and the low pass filter 64 have been described as examples in which the components of the drive section are replaced. However, the component to be replaced of the drive section is not limited thereto. For example, the entire control board 60 may be replaced in the drive section. In that case, the image forming system 1 acquires the identification information 73 and the control information 74 of the control board 60 and updates the conversion conditions in the conversion condition information 84, thereby making it possible to appropriately detect the load applied to the drive section.

Furthermore, in the above-described embodiment, an example in which the drive section drives the operation mechanism has been described with the post-processing section 14 as an example. However, the image forming apparatus 2 is equipped with various operation mechanisms other than the post-processing section 14. The present invention is applicable even in a case where a component of a drive section that drives an operation mechanism other than the post-processing section 14 has been replaced, and it is possible to appropriately detect a load applied to the drive section after the component replacement.

In the above-described embodiment, an example in which the image forming apparatus 2 conveys a sheet, forms an image to be printed on the sheet, and outputs the sheet has been described. However, an object on which the image forming apparatus 2 performs image formation is not necessarily limited to a sheet. For example, the image forming apparatus 2 may form an image not only on a flexible medium such as a sheet but also on a non-flexible medium such as a CD-ROM. Therefore, the medium that is conveyed by the image forming apparatus 2 and on which an image is formed may be a recording medium other than a sheet.

In addition, the program 83 described in the above embodiment is not limited to a program stored in advance in the storage section 82 of the server apparatus 3. For example, the program 83 may be a transaction target by itself. In this case, the program 83 may be provided in a downloadable form via a network such as the Internet, or may be provided in a state of being recorded on a computer-readable storage medium such as a CD-ROM.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system that conveys a recording medium to form an image, comprising:

a motor that is driven by a drive circuit to drive either:

a conveying operation mechanism comprising a roller and conveying a recording medium, or an image forming operation mechanism comprising an image forming device and forming an image on the recording medium;

a detector that detects a driving state of the motor by the drive circuit;

a central processing unit (CPU) that:

diagnoses an abnormality of the conveying operation mechanism or the image forming operation mechanism based on a load obtained by converting a detection result by the detector based on a predetermined conversion condition, in response to an input indicating that at least one of components of the motor and the drive circuit is replaced, identifies whether the replaced component is a genuine product or a substitute product, and upon identifying the replaced component as the substitute product, updates the conversion condition in accordance with the replaced component.

2. The image forming system according to claim 1, wherein the CPU converts the detection result by the detector into a torque value of the motor based on the conversion condition.

3. The image forming system according to claim 2, wherein the conversion condition includes a torque conversion formula for converting the detection result by the detector into the torque value.

4. The image forming system according to claim 3, wherein the CPU further updates the torque conversion formula in accordance with control at a time when the motor drives the conveying operation mechanism or the image forming operation mechanism.

5. The image forming system according to claim 4, wherein the CPU acquires a control information indicating control at a time when the motor drives the conveying operation mechanism or the image forming operation mechanism, and updates the torque conversion formula based on the control information.

6. The image forming system according to claim 5, wherein the control information includes information related to a control mode in which the drive circuit drives the motor.

7. The image forming system according to claim 3, wherein the CPU acquires identification information of the replaced component, and updates the torque conversion formula based on the identification information.

8. The image forming system according to claim 7, wherein in a case where the motor is replaced, the identification information includes information on the motor attached by the replacement.

9. The image forming system according to claim 7, wherein in a case where the drive circuit has been replaced, the identification information includes information on the drive circuit attached by replacement.

10. The image forming system according to claim 7, further comprising:

an operation part operable by user, wherein the CPU acquires the identification information based on information input to the operation part.

11. The image forming system according to claim 7, wherein the CPU acquires the identification information from a storage section mounted on the replaced component.

12. The image forming system according to claim 7, further comprising:

a communication interface that communicates with an external device, wherein the CPU acquires the identification information transmitted from the external device via the communication interface.

13. The image forming system according to claim 3, wherein the CPU selects, from among a plurality of torque conversion formula prepared in advance, a torque conversion formula corresponding to the replaced component.

14. The image forming system according to claim 3, wherein the CPU modifies the torque conversion formula applied before the replacement of the component in accordance with the component attached by the replacement.

15. A diagnostic method in an image forming system that conveys a recording medium to form an image, wherein the diagnostic method comprises:

acquiring a detection result obtained by detecting a driving state of a motor that is driven by a drive circuit to drive either:

a conveying operation mechanism comprising a roller and conveying a recording medium, or an image forming operation mechanism comprising an image forming device and forming an image on the recording medium;

diagnosing an abnormality of the conveying operation mechanism or the image forming operation mechanism based on a load obtained by converting the detection result based on a predetermined conversion condition;

in response to an input indicating that at least a part of components of the motor and the drive circuit is replaced, identifies whether the replaced component is a genuine product or a substitute product; and upon identifying the replaced component as the substitute product, updating the conversion condition in accordance with the replaced component.

16. A non-transitory computer-readable recording medium storing a computer readable program to be executed by a hardware processor in a server apparatus capable of communicating with an image forming apparatus that conveys a recording medium to form an image, the program causing the hardware processor to execute:

acquiring a detection result obtained by detecting a driving state of a motor that is driven by a drive circuit to drive either:

a conveying operation mechanism comprising a roller, or an image forming operation mechanism comprising an image forming device in the image forming apparatus;

diagnosing abnormality of the conveying operation mechanism or the image forming operation mechanism based on a load obtained by converting the detection result based on a predetermined conversion condition;

in response to an input indicating that at least a part of components of the motor and the drive circuit is replaced, identifies whether the replaced component is a genuine product or a substitute product; and in the image forming apparatus, upon identifying the replaced component as the substitute product, updating the conversion condition in accordance with the replaced component.

* * * * *